US012766935B2

(12) United States Patent
Xu

(10) Patent No.: US 12,766,935 B2
(45) Date of Patent: Oct. 20, 2026

(54) LATCHING MECHANISM FOR TRUCK BED COVER

(71) Applicant: Cixi City Liyuan Auto Parts Co., Ltd, Cixi City (CN)

(72) Inventor: Enli Xu, Cixi City (CN)

(73) Assignee: Cixi City Liyuan Auto Parts Co., Ltd, Cixi City (CN)

( * ) Notice: Subject to any disclaimer, the term of this patent is extended or adjusted under 35 U.S.C. 154(b) by 373 days.

(21) Appl. No.: 18/428,541

(22) Filed: Jan. 31, 2024

(65) Prior Publication Data

US 2025/0153552 A1 May 15, 2025

(30) Foreign Application Priority Data

Nov. 15, 2023 (CN) ........................ 202323086771.0

(51) Int. Cl.
*B60J 7/19* (2006.01)

(52) U.S. Cl.
CPC .................................... *B60J 7/198* (2013.01)

(58) Field of Classification Search
CPC ................................. B60J 7/198; B60J 7/185
USPC .................................................... 296/100.01
See application file for complete search history.

(56) References Cited

U.S. PATENT DOCUMENTS 7,628,442 B1 * 12/2009 Spencer .................. B60J 7/104 296/100.07
11,014,436 B1 * 5/2021 Zheng ...................... B60J 7/198
2010/0270824 A1 * 10/2010 Yue .......................... B60J 7/198 296/100.07
2012/0187713 A1 * 7/2012 Williamson ............. B60J 7/104 403/322.4
2017/0066311 A1 * 3/2017 Facchinello ............. B60J 7/198
2022/0203813 A1 * 6/2022 Shen ...................... B60J 7/1607

* cited by examiner

*Primary Examiner* — Caroline N Butcher
(74) *Attorney, Agent, or Firm* — Rhodes IP PLC; Christopher R Rhodes

(57) ABSTRACT

A locking mechanism for a truck bed cover includes a connector, a clamp, an actuator, and a pivot shaft. The connector is configured to attach to the cover of the truck bed. The clamp is configured to abut against the truck wall. The actuator is configured to pivotally connect to the clamp. The pivot shaft is configured to rotatably connect within a bore of the actuator, forming a fixed connection between the connector and the pivot shaft. When the actuator rotates relative to the pivot shaft, it drives the connector to move in the vertical direction. A locking structure, located between the actuator and the pivot shaft, includes a latch and a locking groove. The locking mechanism is provided with a locking structure between the actuator and the pivot shaft, which automatically completes locking or unlocking as the actuator rotates relative to the pivot shaft.

15 Claims, 9 Drawing Sheets

LATCHING MECHANISM FOR TRUCK BED COVER

CROSS-REFERENCE TO RELATED APPLICATIONS

This application claims priority under 35 U.S.C. § 119 (a) to Chinese Patent Application No. 2023230867710, filed on Nov. 15, 2023, which is hereby incorporated by reference herein in its entirety.

TECHNICAL FIELD

This disclosure generally relates to methods, systems, and devices for implementing a latching mechanism for a truck bed cover.

BACKGROUND ART

The pickup truck, as a type of automobile, is popular for its open rear cargo area, capable of carrying a large amount of goods. However, a drawback is that conventional pickup trucks are not equipped with a cover, causing goods to get wet from rainwater entering the cargo area during rainy or snowy weather and resulting in significant economic losses due to damaged goods. Therefore, existing technology requires models with open rear cargo areas to be equipped with a cover that can be opened to protect and shield the goods inside the cargo area.

While installing a cover on the cargo area, to prevent the cover from accidentally opening due to vibration during travel, it is necessary to ensure the firmness and tightness of the cover when closed by incorporating a latching mechanism to lock the cover in the closed state.

However, a problem with existing latching mechanisms on the market is that the cover and the latching mechanism are both affected by vibrations when the truck encounters bumps during travel. Therefore, the latching mechanism may become automatically unlocked due to vibration, leading to the failure of the cover to remain locked.

In response to the above situation, various latching mechanisms have emerged on the market that can lock the operating component. However, these existing latching mechanisms require additional external structures to limit the operating component or significant modifications to the structure of the traditional latching mechanism, adding a large number of parts to achieve the purpose of locking the operating components of the latching mechanism. This not only increases the complexity of the structure but also significantly increases the production cost of the latching mechanism.

SUMMARY

The present disclosure relates to a latching mechanism for truck bed covers. One general aspect of certain embodiments provides a latching mechanism for a truck bed cover, comprising connectors, latches, actuators, and pivot shafts. The connectors are configured to be connected to the cover of the rear truck bed. The latches are configured to abut against the truck wall. The actuators are configured to be movably connected to the latches. The pivot shafts are configured to be rotatably connected within the pivot holes of the actuators, where the connectors form a fixed connection with the pivot shafts. When the actuators rotate relative to the pivot shafts, they drive the connectors to move in a vertical direction. There is a locking structure between the actuators and the pivot shafts, which includes a locking tongue and a lock groove. The locking tongue is configured to be installed in the slot of the pivot shaft, and the lock groove is configured to be set on the hole wall of the pivot hole. When the actuators rotate relative to the pivot shafts, the locking tongue extends from or retracts into the pivot shaft;

- when the locking tongue extends from the pivot shaft, the top of the locking tongue abuts against the lock groove, and the bottom of the locking tongue is located within the slot, thus obstructing the rotation of the actuators relative to the pivot shafts;
- when the locking tongue retracts into the pivot shaft, the top of the locking tongue releases from the lock groove, and the entire locking tongue is located within the slot, releasing its obstruction of the rotation of the actuators relative to the pivot shafts.

According to some embodiments disclosed herein, the locking structure further includes a spring, said spring being configured to be installed in the slot of the pivot shaft and situated between the bottom of the locking tongue and the slot.

According to some embodiments disclosed herein, the actuator includes a handle.

According to some embodiments disclosed herein, the actuator includes a protrusion, said protrusion being configured to abut against the latch.

According to some embodiments disclosed herein, the latch comprises a clamp slot arranged at the upper end of the latch and a clamp lip for defining the clamp slot.

According to some embodiments disclosed herein, the latch further comprises two connecting plates, the two connecting plates being symmetrically distributed on both sides of the lower end of the latch, wherein the protrusion of the actuator is located between the two connecting plates.

According to some embodiments of the present disclosure, the connecting plate includes a first protrusion located on the inner side of the connecting plate, and the protrusion includes second protrusions located on each side of the protrusion, with the first protrusion abutting against the upper side of the second protrusions.

According to some embodiments of the present disclosure, the second protrusion is designed to extend along the edge of the protrusion, and the first protrusion is configured to be able to slide along the second protrusions.

According to some embodiments of the present disclosure, the locking tongue includes a first curved surface located at the top of the locking tongue, and the locking slot includes a second curved surface located at the bottom of the locking slot. When the locking tongue is pressed tightly against the locking slot, the first curved surface adheres to the second curved surface.

According to some embodiments of the present disclosure, the locking tongue is configured as spherical, and the locking slot is configured as an arc-shaped groove.

According to some embodiments of the present disclosure, the clamp includes a first groove located on the lower end side wall of the clamp, and the actuator includes a third protrusion located at the top of the actuator, with the third protrusion configured to form a mating connection with the first groove.

According to some embodiments of the present disclosure, the clamp also includes a round hole, which is configured to pass through the upper and lower ends of the clamp, and the connector extends through the hole to the lower part of the clamp.

According to some embodiments of the present disclosure, the actuator includes a through slot, which is configured to pass through the left and right sides of the actuator, and the lower end of the connector extends into the through slot.

According to some embodiments of the present disclosure, the through hole is intersected by the through slot, forming front and rear holes that are separated from each other.

According to some embodiments of the present disclosure, both the front and rear holes contain locking slots, and the locking tongue includes front and rear locking tongues. The front locking tongue is configured to engage with the locking slot inside the front hole, and the rear locking tongue is configured to engage with the locking slot inside the rear hole.

It is to be appreciated that embodiments of the present disclosure provide many advantages over conventional techniques. Among other things, embodiments provide a truck cover latch mechanism that includes a locking structure between the actuator and the mounted shaft. As the actuator rotates relative to the shaft, the locking structure automatically locks or unlocks, making it very convenient without the need for additional operations. Furthermore, since the shaft and actuator are both originally existing structures, this locking mechanism can achieve the addition of the locking structure without making substantial modifications to the two.

The present disclosure achieves these benefits and others in the context of known technology. However, a further understanding of the nature and advantages of the present disclosure may be realized by reference to the latter portions of the specification and attached drawings.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
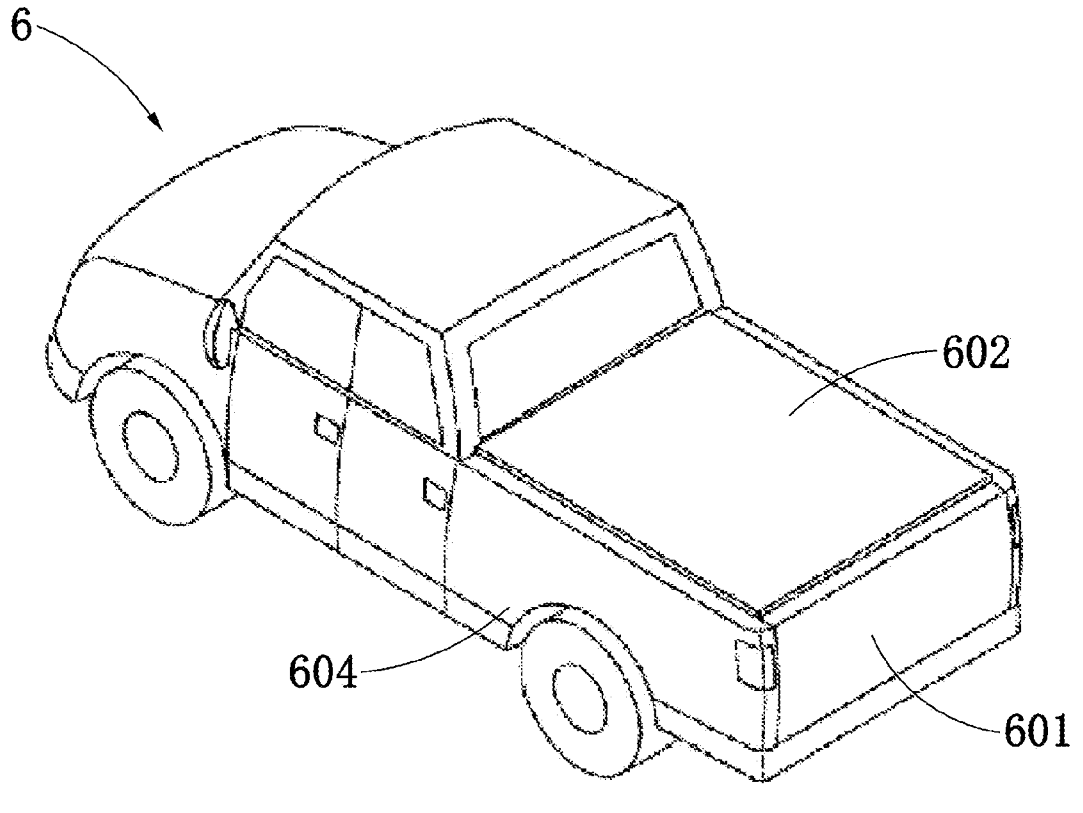
FIG. 1 is a schematic diagram of the structure of a truck and a truck bed cover according to various embodiments.

Various uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above described features.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present disclosure may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

We now turn to the embodiments as illustrated by the drawings in FIGS. 1-9, which depict some features of the latch mechanism for implementing the truck bed cover on a truck. The methods, systems, and apparatuses illustrated in FIGS. 1-9 refer to examples of different embodiments that include various components and steps, which can be considered as alternatives or which can be used in conjunction with one another in the various embodiments. The description of the illustrated methods, systems, and apparatuses shown in FIGS. 1-9 is provided for purposes of illustration and should not be considered to limit the scope of the different embodiments. Furthermore, the various components of the figures are merely illustrative and are not intended to be to scale.

With reference to the figures, FIG. 1 is a schematic diagram of a truck 6 and its rear compartment 601, which is covered by a compartment cover 602. The rear compartment 601 can be used for storing items, and the upper compartment cover 602 prevents items from falling out of the rear compartment 601 during truck movement and also prevents rain or dust from entering the rear compartment 601. The compartment cover 602 is connected to the truck wall 604 of the rear compartment 601.

Figure 2:
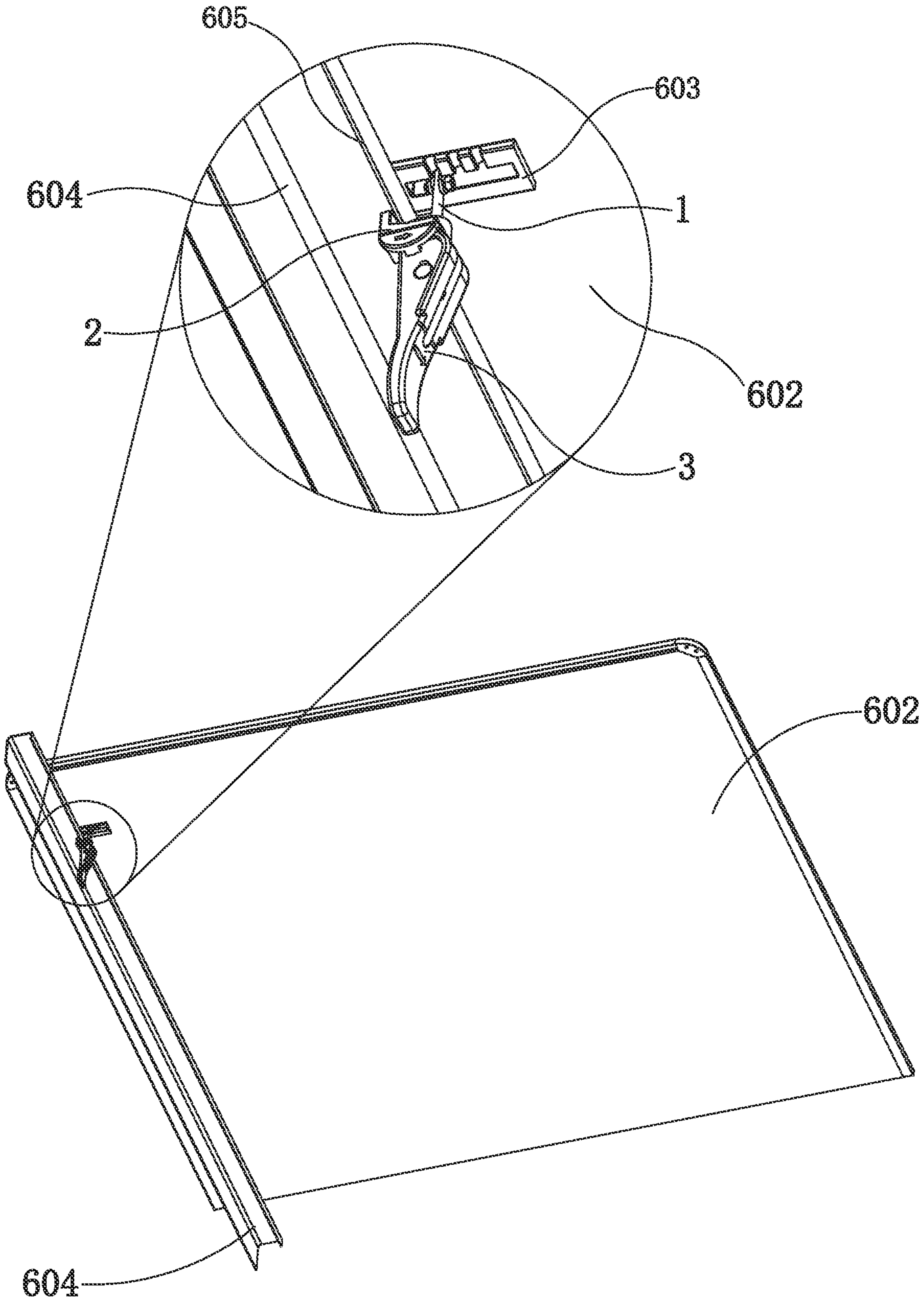
FIG. 2 is a schematic diagram of the structure between the truck bed wall, truck bed cover, and latch mechanism according to various embodiments.

FIG. 2 is a schematic diagram of the structure between the truck bed wall, compartment cover, and latch mechanism. The compartment cover 602 includes connecting blocks 603 located at the two side edges of the compartment cover 602, and the truck wall 604 of the rear compartment 601 includes an inwardly folded truck wall edge 605. The connecting piece 1 of the latch mechanism is fixedly connected to the connecting block 603 of the compartment cover 602, and the clasp 2 of the latch mechanism is configured to be movable relative to the truck wall edge 605 of the truck wall 604.

Figure 3:
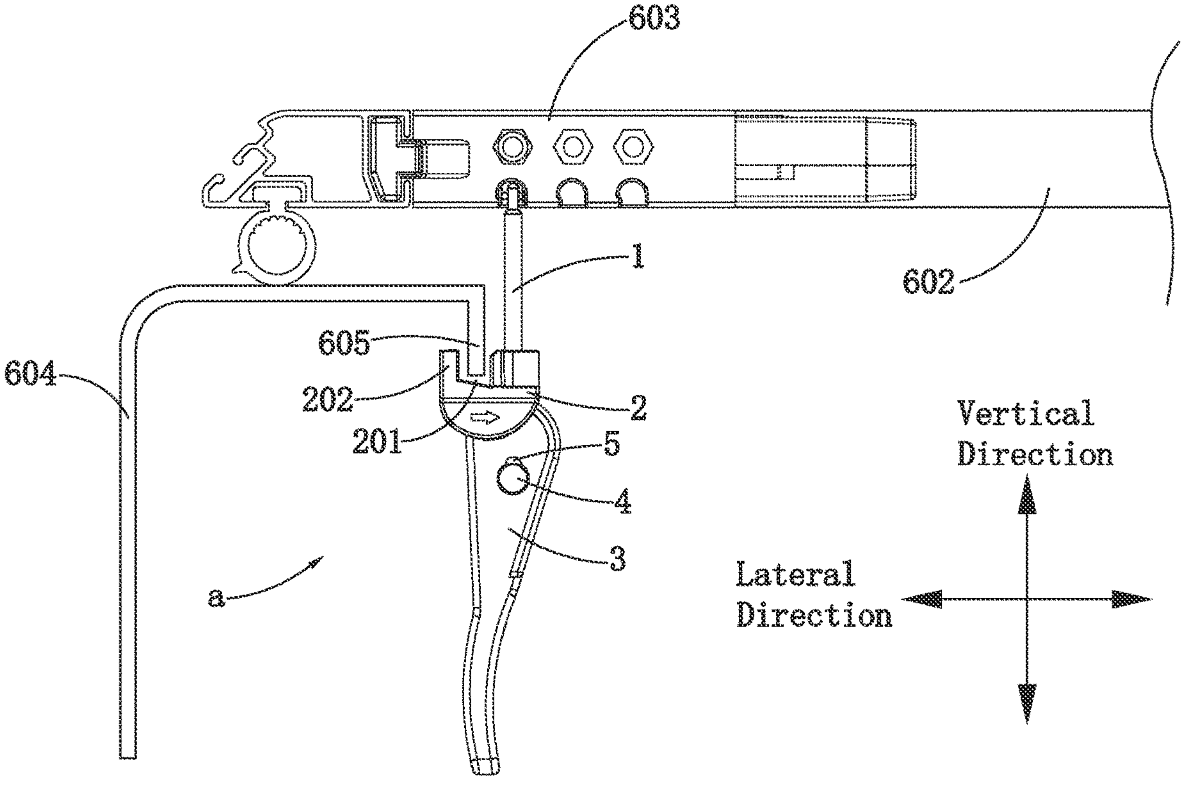
FIG. 3 is a schematic diagram showing the coordination between the truck bed wall, the truck bed cover, and the latch mechanism in the closed state according to various embodiments.
Figure 4:
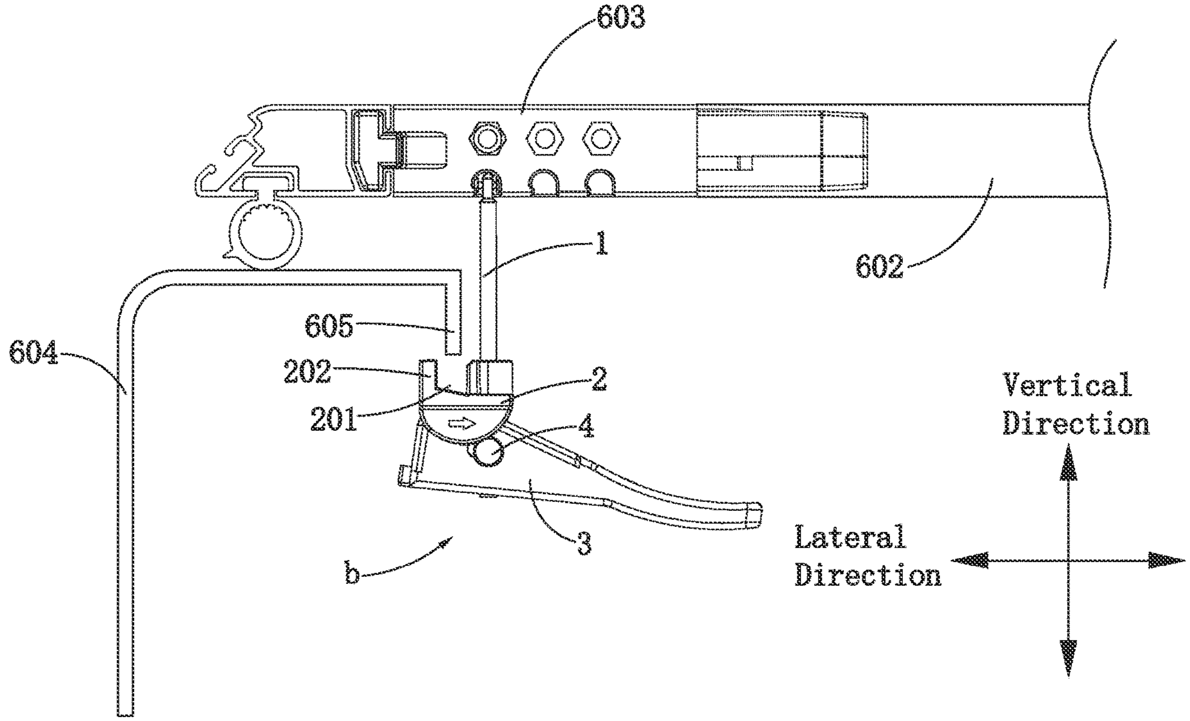
FIG. 4 is a schematic diagram showing the coordination between the truck bed wall, the truck bed cover, and the latch mechanism in the open state according to various embodiments.

FIG. 3 and FIG. 4 are schematic diagrams of the coordination between the truck wall 604, the compartment cover 602, and the latch mechanism. In FIG. 3, the latch mechanism is shown in the closed state b. In the closed state b, the clasp 2, under the driving of the actuator 3, is located at the truck wall edge 605 of the rear compartment 601, with the clasp groove 201 receiving the truck wall edge 605 and the clasp lip 202 pressing against the truck wall edge 605. At this point, the compartment cover 602 can be tightly closed on the truck wall 604 under the pulling of the connecting piece 1. In addition, in FIG. 4, the latch mechanism is shown in the open state a. In the open state a, under the driving of the actuator 3, the clasp 2 moves away from the truck wall edge 605 of the rear compartment 601, allowing the truck wall edge 605 to disengage from the clasp groove 201. In this open state, the movable latch mechanism is disengaged from the truck wall edge 605, and the compartment cover 602 can be removed from the rear compartment 601.

Figure 5:
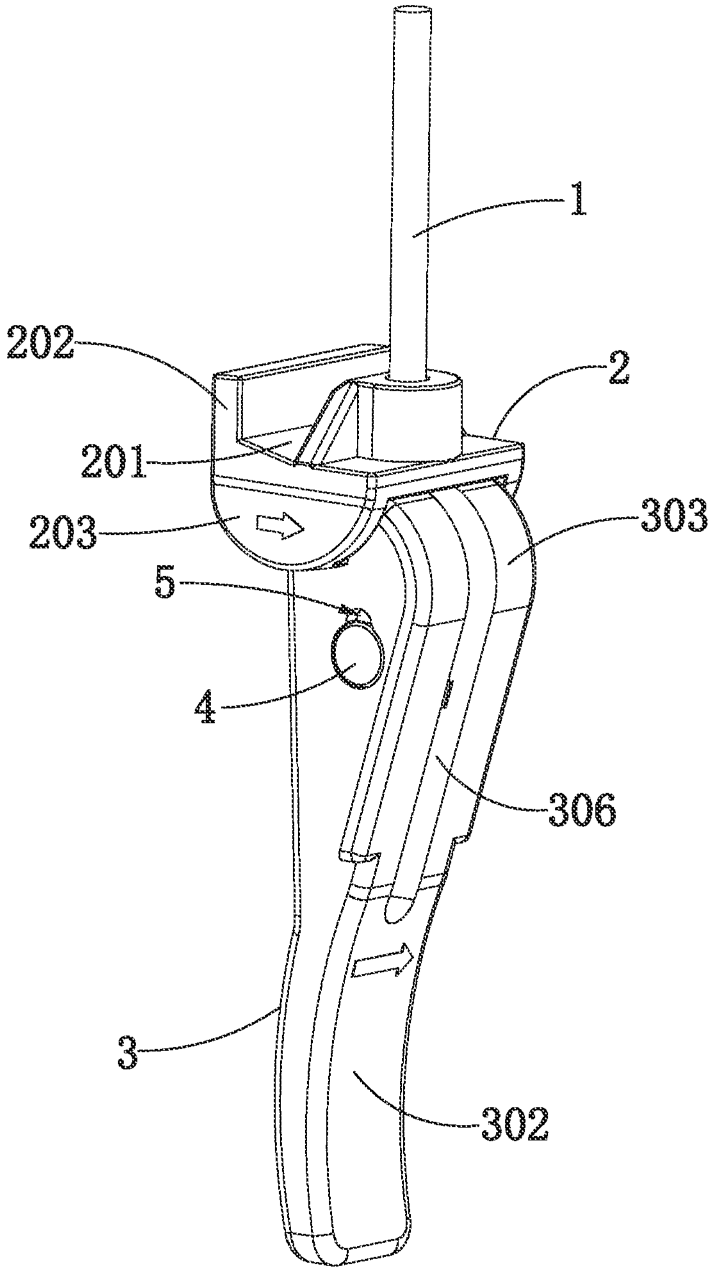
FIG. 5 is a schematic diagram of the structure of the latch mechanism according to various embodiments.
Figure 6:
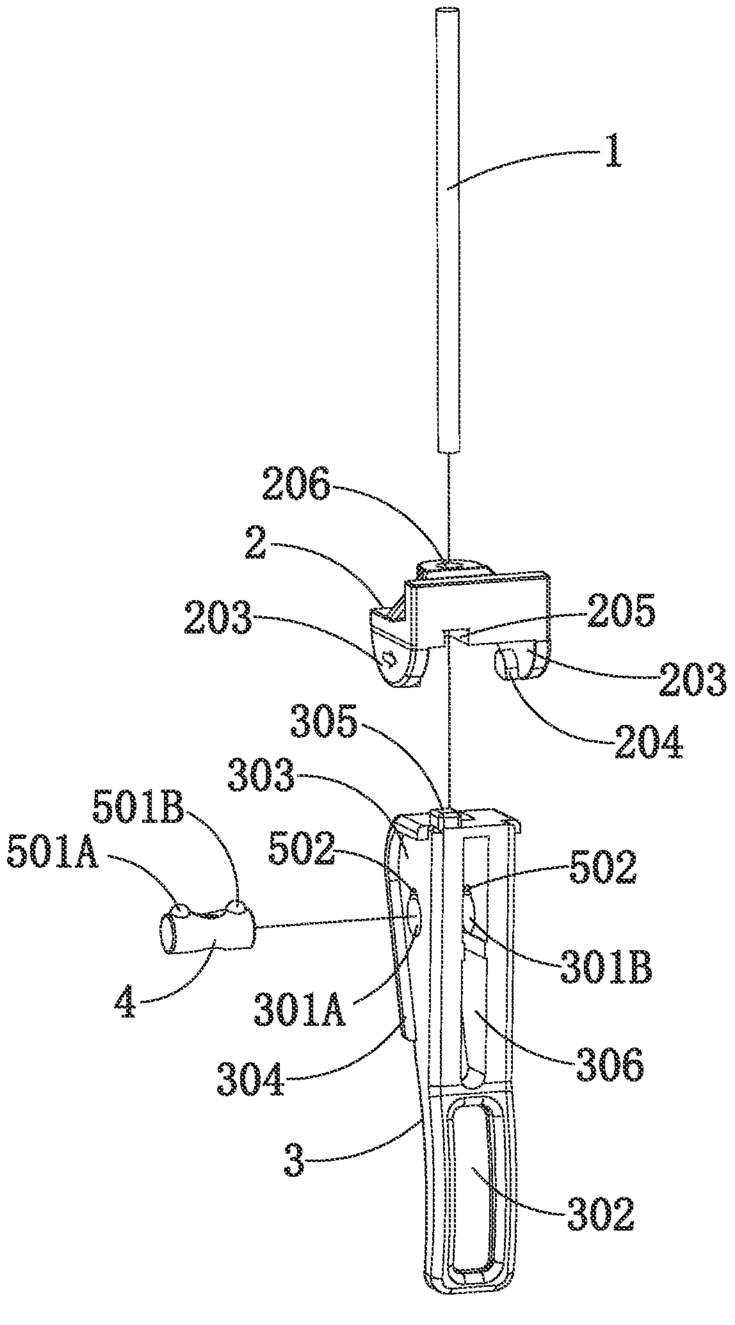
FIG. 6 is an exploded view of the latch mechanism according to various embodiments.

FIG. 5 is a schematic diagram of the structure of the latch mechanism. In conjunction with the exploded schematic diagram of the latch mechanism as shown in FIG. 6, it illustrates the main components of the latch mechanism, including an actuator 3, a clamp 2, and a connector 1. The actuator 3 has a rotating hole 301, inside of which a pivot shaft 4 is rotatably mounted. One end of the connector 1 is fixedly connected to the pivot shaft 4. From FIG. 3 and FIG. 4, it can be observed that the other end of the connector 1 is fixedly connected to the connection block 603 of the truck bed cover 602. The clamp 2 has a circular hole 206 and a through groove 306 on the actuator 3. The connector 1 sequentially passes through the circular hole 206 and the through groove 306 on the actuator 3 before being connected to the pivot shaft 4.

The actuator 3 is movably arranged relative to the clamp 2, and includes a protruding part 303 connected to the clamp 2 and a handle 302 for gripping. When the upper end of the connector 1 is fixed and the actuator 3 rotates relative to the pivot shaft 4, the interaction between the protruding part 303 and the clamp 2 causes the actuator 3 to drive the movement of the clamp 2.

Two second projections 304 are provided on both sides of the protruding part 303 of the actuator 3 to guide the movement of the actuator 3. On the lower end of the clamp 2, two inner-facing second projections 304 are provided on the connection plates 203. The first projection 204 abuts against the second projection 304, and when the actuator 3 rotates relative to the pivot shaft 4, the first projection 204 is able to slide along the second projection 304. Additionally, there is a first groove 205 on the side surface of the lower end of the clamp 2, which is used to limit the movement of the actuator 3. There is also a third projection 305 on the actuator 3 that can engage with the first groove 205. When the actuator 3 is rotated to switch the latch mechanism to a closed state, the third projection 305 engages with the first groove 205, preventing the actuator 3 from continuing to rotate.

As the actuator 3 rotates relative to the pivot shaft 4, it is able to move relative to the clamp 2. Due to the fixed connection between the upper end of the connector 1 and the connection block 603 of the truck bed cover 602, and the fixed connection between the lower end of the connector 1 and the pivot shaft 4, when the actuator 3 moves, the protruding part 303 acts on the clamp 2, driving the movement of the clamp 2. Since the connector 1 passes through the circular hole 206 in the clamp 2, the clamp 2 can only move vertically along the connector 1. As the clamp 2 moves, it can move away from or towards the edge 605 of the truck bed, allowing the latch mechanism to switch between an open state a and a closed state b.

Figure 7:
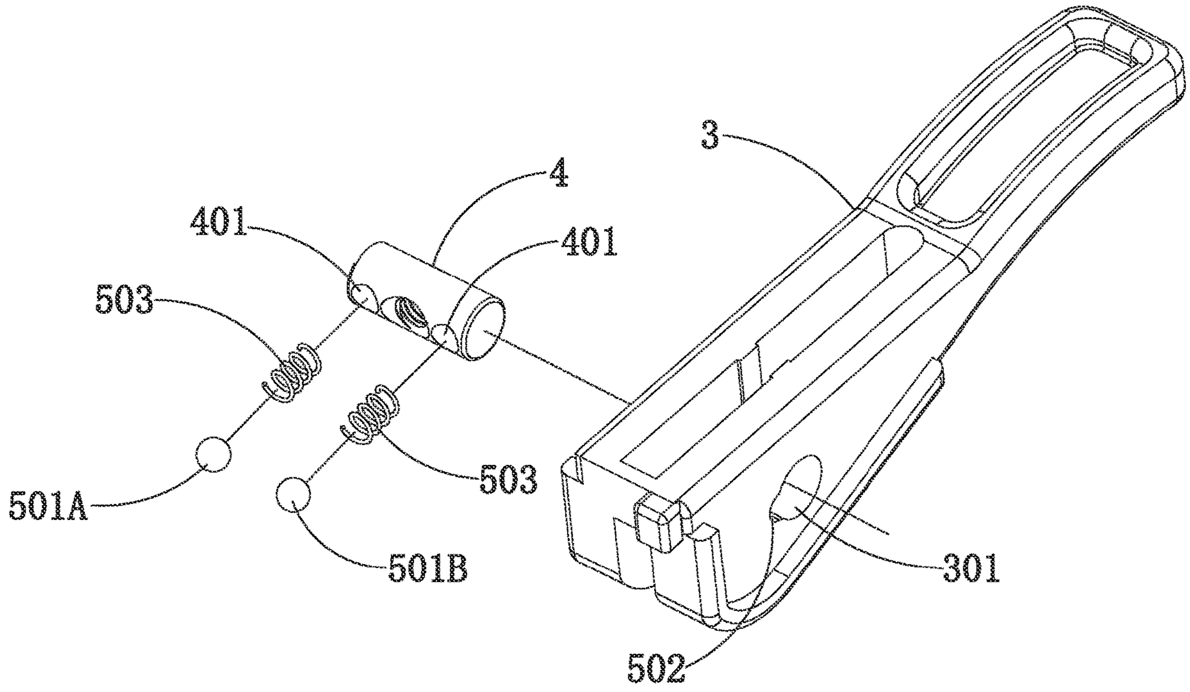
FIG. 7 is an exploded view of the actuator, mounted shaft, and locking structure according to various embodiments.

FIG. 7 is an exploded schematic diagram of the actuator 3, pivot shaft 4, and locking structure 5, it can be seen that there is a locking structure 5 between the actuator 3 and the pivot shaft 4. The locking structure 5 is composed of a locking tongue 501 and a locking groove 502. The locking tongue 501 can be configured as a ball-shaped setting, and the locking groove 502 can be configured as an arc-shaped groove. The locking groove 502 is set on the actuator 3. The rotating hole 301 on the clamp 2 is divided into front hole 301A and rear hole 301B by the through groove 306, and each of the front hole 301A and rear hole 301B is provided with a locking groove 502. Two slots 401 for embedding the locking tongue 501 are opened on the pivot shaft 4, and the locking tongue 501 includes front locking tongue 501A and rear locking tongue 501B, which are respectively inserted into the slots 401. Each slot 401 also has a spring 503 passing through it, and the spring 503 is located between the bottom of the slot and the locking tongue 501, exerting a force on the locking tongue 501 to always have a tendency to move away from the slot 401. When the locking tongue 501 is not affected by other external forces, it will protrude from the slot 401 under the action of the spring 503. The locking tongue 501 can also overcome the force of the spring 503 under external force to hide inside the slot 401. Therefore, the locking structure 5 has at least a locked state c and an unlocked state d.

Figure 8:
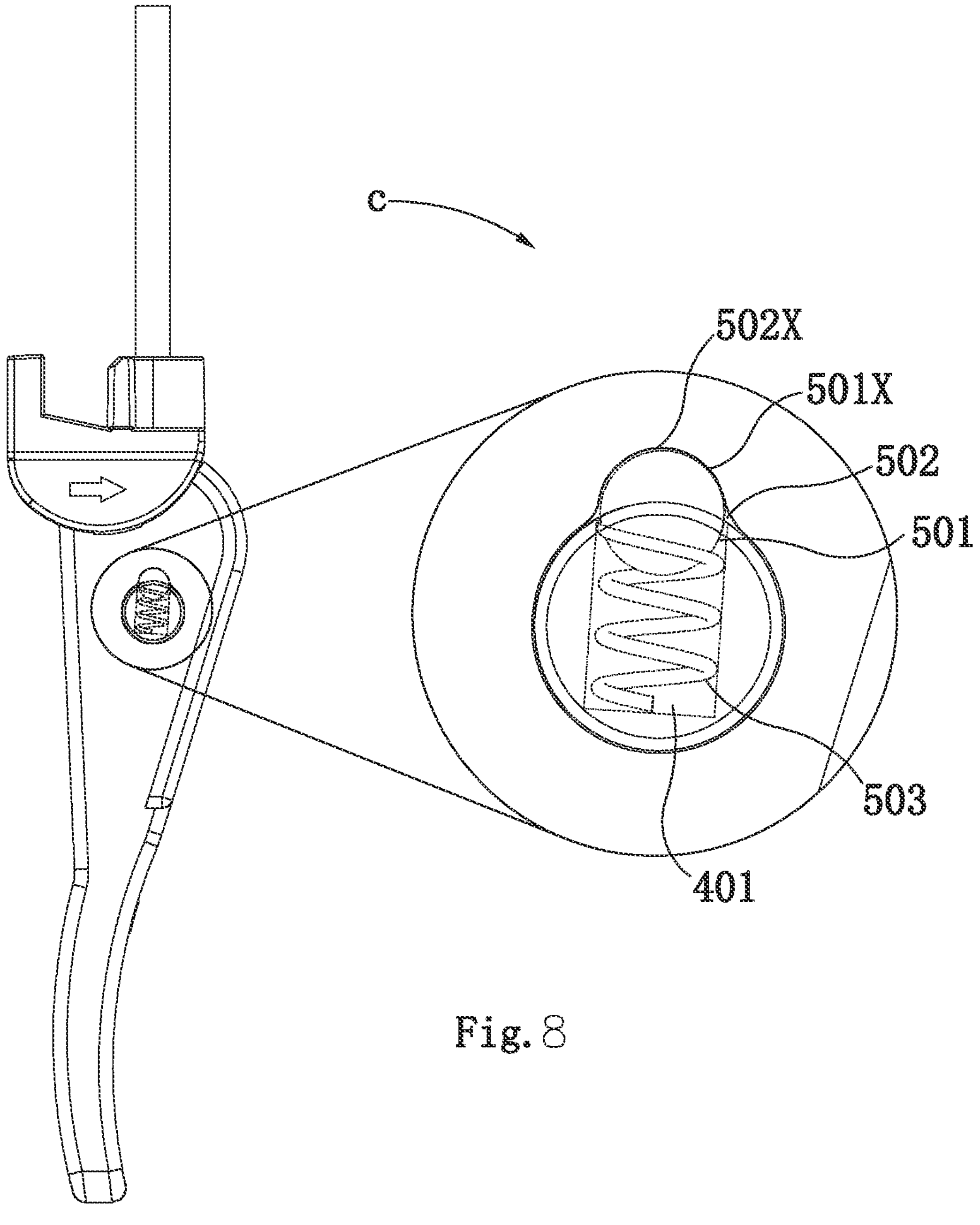
FIG. 8 is a schematic diagram showing the state of the locking structure in the closed state according to various embodiments.

FIG. 8 is a schematic diagram of the collaboration between the locking structure 5 in the locked state c and the actuator 3, and the pivot shaft 4. When the locking structure 5 is in the locked state c, the locking tongue 501 protrudes from the slot 401 of the pivot shaft 4 under the action of the spring 503, allowing the top first arc surface 501X of the locking tongue 501 to be closely against the second arc surface 502X on the bottom of the locking groove 502. The locking tongue 501 acts between the pivot shaft 4 and the actuator 3, thereby causing the locking structure 5 to act on the actuator 3 and the pivot shaft 4 to impede their relative rotation.

Figure 9:
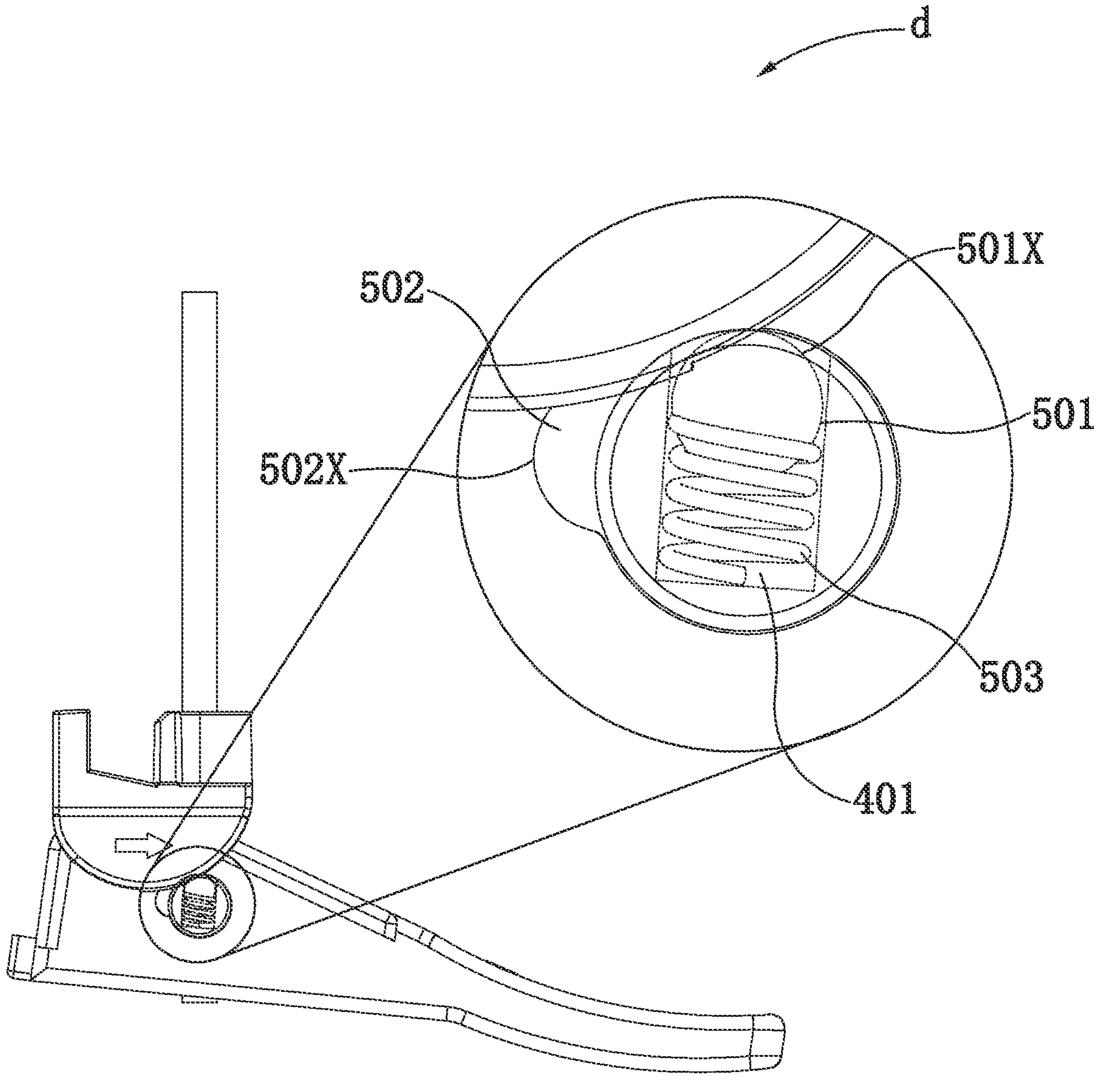
FIG. 9 is a schematic diagram showing the state of the locking structure in the open state according to various embodiments.

FIG. 9 is a schematic diagram of the collaboration between the locking structure 5 in the unlocked state d and the actuator 3, and the pivot shaft 4. When the locking structure 5 is in the unlocked state d, the locking tongue 501 retracts into the slot 401 under the pressure from the hole wall of the rotating hole 301, releasing the action of the locking tongue 501 on the pivot shaft 4 and the actuator 3, thereby eliminating the hindrance to the relative rotation of the actuator 3 with respect to the pivot shaft 4.

Finally, combining FIG. 3 to FIG. 9, it can be concluded that when the actuator 3 is rotated relative to the pivot axis 4, the actuator 3 can move relative to the clasp 2 and drive the clasp 2 to move with it. Therefore, when the actuator 3 is rotated to switch between the open state a and the closed state b of the latch mechanism, the locking structure 5 inside the latch mechanism can also automatically switch between the locked state c and the unlocked state d. When the latch mechanism is in the open state a, the locking structure 5 is in the unlocked state d. When the latch mechanism is in the closed state b, the locking structure 5 is in the locked state c.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A latching mechanism for the truck bed cover, comprising:

- a connecting member, configured to connect to the cover of the truck bed;
- a clamp, configured to abut against the truck wall;
- an operating component, configured for articulated connection to the clamp;
- a pivot shaft, configured for rotatable connection within a pivot hole of the operating component, with the connecting member forming a fixed connection to the pivot shaft;
- when the operating component rotates relative to the pivot shaft, it drives the connecting member to move vertically;
- wherein the operating component and the pivot shaft are equipped with a locking structure, including:
- a locking tongue, installed in a slot of the pivot shaft;
- locking grooves, set on a hole wall of the pivot hole;
- when the operating component rotates relative to the pivot shaft, the locking tongue extends from or retreats into the pivot shaft;
- when the locking tongue extends from the pivot shaft, the top of the locking tongue presses against the locking groove, and the bottom of the locking tongue is located in the slot of the pivot shaft, causing the locking tongue to act between the operating component and the pivot shaft, thereby obstructing the rotation of the operating component;
- when the locking tongue retreats into the pivot shaft, the top of the locking tongue releases from the locking groove, with the locking tongue as a whole located in the slot of the pivot shaft, relieving the effect of the locking tongue on the operating component and the pivot shaft, thus removing the obstruction to the rotation of the operating component.

2. The latching mechanism for the truck bed cover as claimed in claim 1, wherein the locking structure also includes:

- a spring, mounted in the slot of the pivot shaft, located between the locking tongue and a bottom of the slot of the pivot shaft.

3. The latching mechanism for the truck bed cover as claimed in claim 2, wherein the operating component comprises a handle.

4. The latching mechanism for the truck bed cover as claimed in claim 3, wherein the operating component includes a protrusion, configured to abut against the clamp.

5. The latching mechanism for the truck bed cover as claimed in claim 4, wherein the clamp includes a clamp slot set on the upper end of the clamp, and a clamp lip used to define the clamp slot.

6. The latching mechanism for the truck bed cover as claimed in claim 5, wherein the clamp also includes two connecting plates, symmetrically distributed on both sides of the lower end of the clamp, with the protrusion of the operating component located between the two connecting plates.

7. The latching mechanism for the truck bed cover as claimed in claim 6, wherein each of the two connecting plates includes a first protrusion located on an inner side of the respective connecting plate, and the protrusion includes a second protrusion located on both sides of the protrusion, with the first protrusion abutting against the upper side of the second protrusion.

8. The latching mechanism for the truck bed cover as claimed in claim 7, wherein the second protrusion is configured to extend along the edge of the protrusion, and the first protrusion is configured to slide along the second protrusion.

9. The latching mechanism for the truck bed cover as claimed in claim 8, wherein the locking tongue includes a first arc face at the top of the locking tongue, and locking grooves include a second arc face at the bottom of the locking grooves, such that when the locking tongue abuts against the locking grooves, the first arc face and the second arc face make contact.

10. The latching mechanism for the truck bed cover as claimed in claim 9, wherein the locking tongue is configured as a spherical shape and the locking grooves are configured as arched grooves.

11. The latching mechanism for the truck bed cover as claimed in claim 10, wherein the clamp includes a first groove on the side wall at the lower end of the clamp, and the operating component includes a third protrusion at the top end of the operating component, with the third protrusion configured to engage with the first groove.

12. The latching mechanism for the truck bed cover as claimed in claim 11, wherein the clamp also includes a circular hole, configured as traversing the upper and lower ends of the clamp, and the connecting member extends through the circular hole to the lower part of the clamp.

13. The latching mechanism for the truck bed cover as claimed in claim 12, wherein the operating component includes a through groove and the connecting member's lower end extends into the through groove.

14. The latching mechanism for the truck bed cover as claimed in claim 12, wherein the pivot hole is cut off by the through groove, and the pivot hole forms separated front and rear holes.

15. The latching mechanism for the truck bed cover as claimed in claim 12, wherein the front and rear holes both include locking grooves, the locking tongue includes front and rear tongues, the front tongue is configured to engage with the locking groove in the front hole, the rear tongue is configured to engage with the locking groove in the rear hole.

* * * * *